(12) United States Patent
Aylward et al.

(10) Patent No.: US 7,507,012 B2
(45) Date of Patent: Mar. 24, 2009

(54) LCD DISPLAYS WITH LIGHT REDIRECTION

(75) Inventors: Peter T. Aylward, Hilton, NY (US);
Robert P. Bourdelais, Rochester, NY (US); Qi Hong, Rochester, NY (US)

(73) Assignee: Rohm and Haas Denmark Finance A/S, Copenhagen (DK)

( * ) Notice: Subject to any disclaimer, the term of this patent is extended or adjusted under 35 U.S.C. 154(b) by 34 days.

(21) Appl. No.: 11/749,180

(22) Filed: May 16, 2007

(65) Prior Publication Data

US 2008/0285307 A1 Nov. 20, 2008

(51) Int. Cl.
*F21V 8/00* (2006.01)
(52) U.S. Cl. .................... 362/625; 362/624; 362/626; 362/627
(58) Field of Classification Search ................ 362/624, 362/625, 626, 627
See application file for complete search history.

(56) References Cited

U.S. PATENT DOCUMENTS

| | | | |
|---|---|---|---|
| 5,400,224 A | 3/1995 | DuNah et al. | |
| 5,499,112 A | 3/1996 | Kawai et al. | |
| 5,575,549 A * | 11/1996 | Ishikawa et al. | 362/625 |
| 5,775,791 A * | 7/1998 | Yoshikawa et al. | 632/625 |
| 5,835,661 A | 11/1998 | Tai et al. | |
| 5,857,761 A | 1/1999 | Abe et al. | |
| 5,971,559 A * | 10/1999 | Ishikawa et al. | 362/625 |
| 6,123,431 A * | 9/2000 | Teragaki et al. | 362/625 |
| 6,714,185 B2 | 3/2004 | Kim et al. | |
| 6,789,921 B1 | 9/2004 | Deloy et al. | |
| 2002/0015299 A1* | 2/2002 | Koyama et al. | 362/31 |
| 2003/0123246 A1 | 7/2003 | Parker | |
| 2005/0231973 A1 | 10/2005 | Cassarly et al. | |
| 2006/0152944 A1 | 7/2006 | Nakayoshi et al. | |
| 2006/0221592 A1 | 10/2006 | Nada et al. | |
| 2007/0008739 A1* | 1/2007 | Kim et al. | 362/612 |

* cited by examiner

*Primary Examiner*—Laura Tso
(74) *Attorney, Agent, or Firm*—Edwin Oh

(57) ABSTRACT

A backlight apparatus for directing light toward a display panel and the resulting display device comprises a solid light-guide comprising opposite TIR surfaces, containing a desired pattern of light redirecting surface features located between the TIR surfaces and interrupting one of the TIR surfaces, the features having a refractive index differing from that of the solid material of the light guide. Such an apparatus provides a more even light distribution to the display.

11 Claims, 5 Drawing Sheets

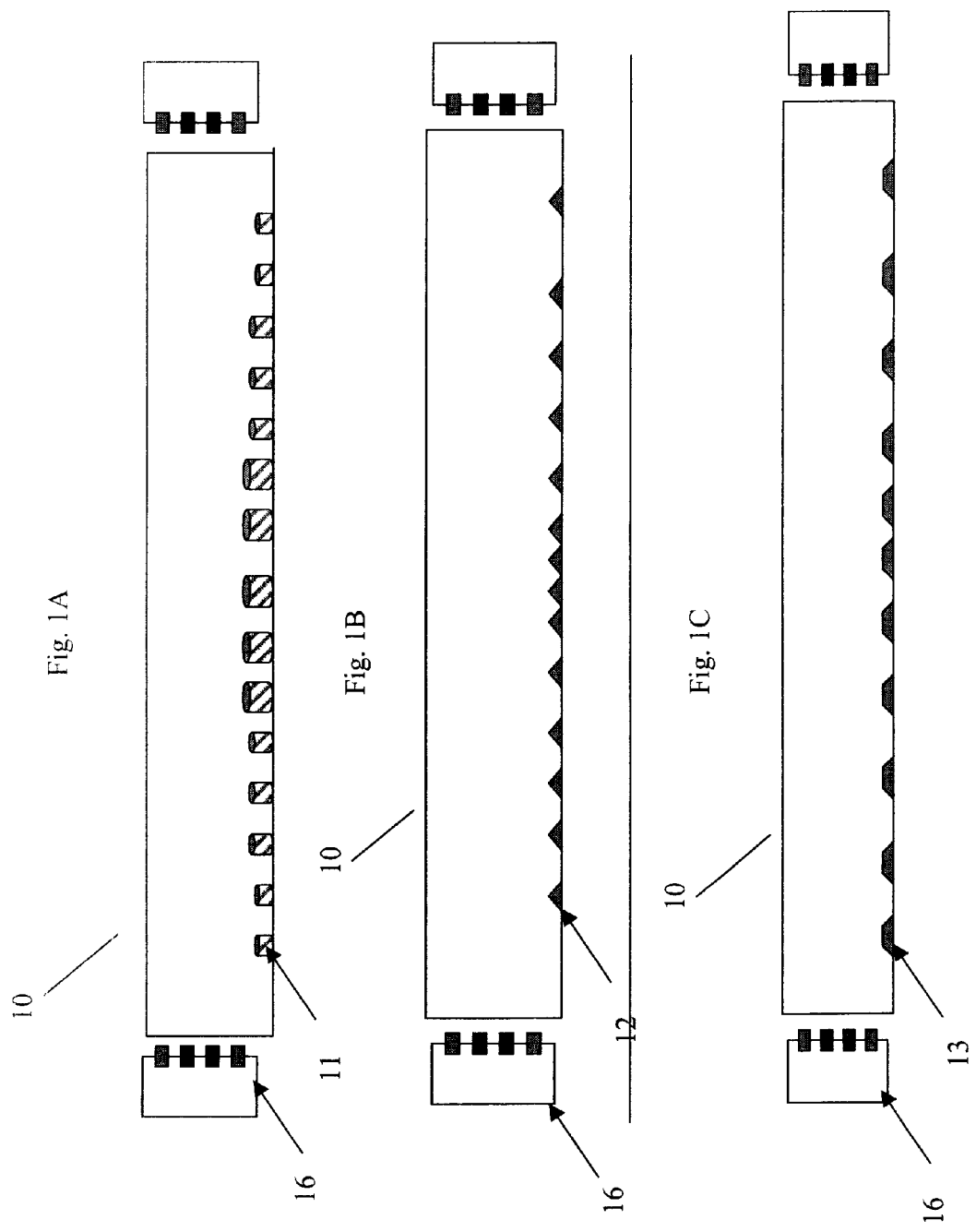

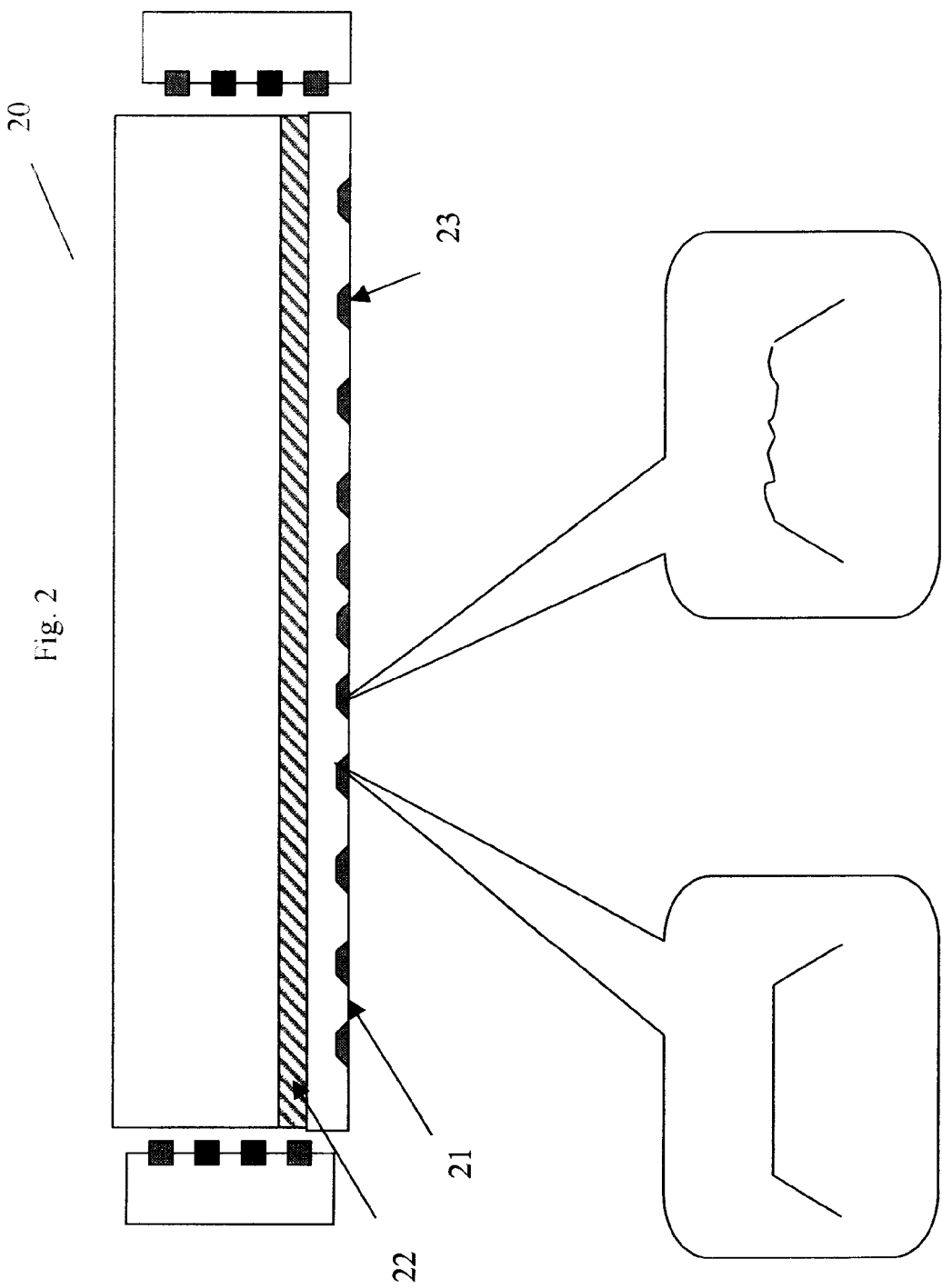

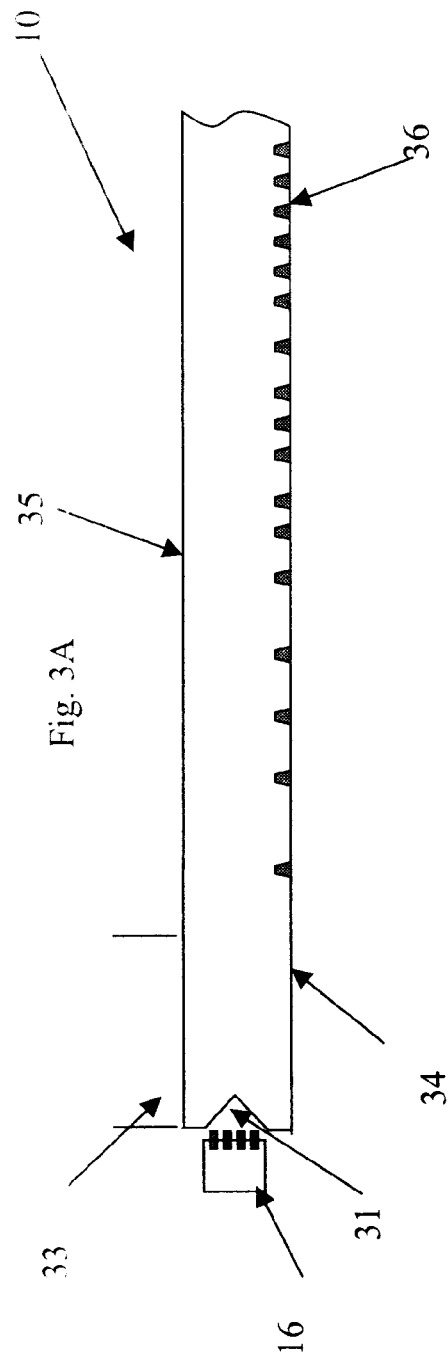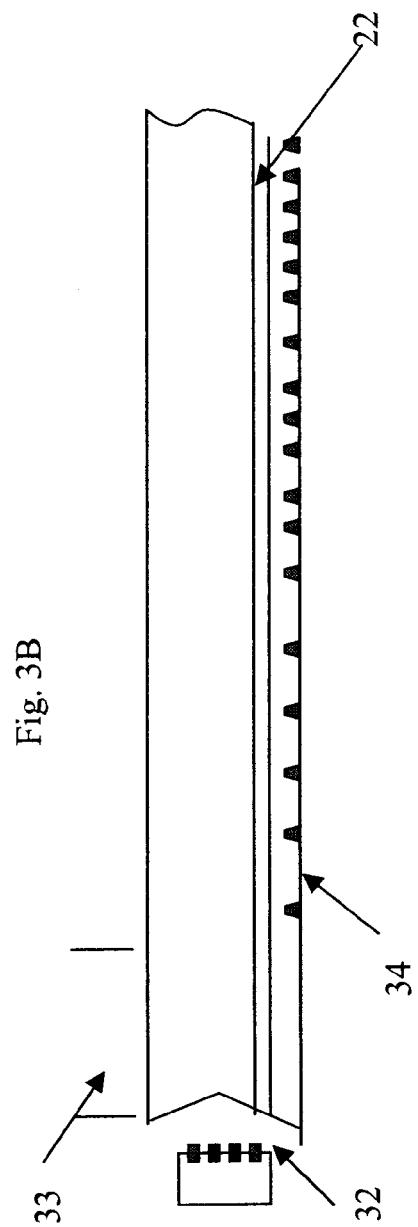

LCD DISPLAYS WITH LIGHT REDIRECTION

CROSS-REFERENCE TO RELATED APPLICATIONS

This application is co-filed with an application under Ser. No. 11/749,171.

FIELD OF THE INVENTION

This invention relates to the art of backlight apparatus for a display and a liquid crystal display employing such apparatus. In particular, the present invention relates to a Liquid Crystal Display (LCD) backlight with solid-state light sources.

BACKGROUND OF THE INVENTION

While liquid crystal displays (LCDs) offer a compact, lightweight alternative to cathode ray tube (CRT) monitors, there are many applications for which the image quality of LCD displays are not yet satisfactory, particularly as the relative size of these devices increases. Larger LCD panels, such as those used in laptop computer or larger displays, are transmissive, and thus require a backlight. This type of light-providing surface, positioned behind the LCD panel, directs light outwards and towards the LCD.

Conventional approaches for backlighting use various arrangements of cold cathode fluorescent (CCFL) light sources with light guide plates, one or more types of enhancement films, polarization films, reflective surfaces, and other light conditioning elements. Conventional flat panel backlight solutions using side-mounted CCFLs are less and less desirable as display size increases and, particularly as display area grows, can be susceptible to warping in manufacture or due to heat. Light-guiding backlight techniques that are conventionally employed for smaller devices are increasingly hampered by low brightness or luminance levels and by problems related to poor uniformity as the display size increases, such as would be needed for digital TV, for example. Existing backlight apparatus for LCD displays and other display and illumination applications, often using banks of CCFLs lined up in parallel, can be relatively inefficient. These display solutions can also be relatively thick, due to the need to house the CCFL and its supporting films and surfaces behind the LC panel. The CCFL light source itself presents an environmental problem for disposal, since these devices contain some amount of mercury. To compensate for uniformity and brightness problems with conventional CCFL-based backlights, a number of supporting films are conventionally interposed between the backlight and the display, or disposed following the display, such as relatively high-cost reflective polarization films for example. As is well known, the spectral characteristics of CCFLs are relatively poor when compared to other types of light sources.

Faced with the inherent difficulties and limitations to CCFL used in backlighting applications, researchers have been motivated to pursue alternative backlighting approaches. A number of solutions have been proposed utilizing Light-Emitting Diodes (LEDs). Recent advances in LED brightness, color output, and overall performance, with continuing reduction in cost, make LEDs, lasers, and solid-state light sources in general particularly attractive. However, because LEDs and lasers act as point light sources, appropriate solutions are needed for redirecting and spreading this light to provide the uniform plane of light that is needed for backlighting and to provide the necessary color uniformity.

One approach for providing backlight illumination using LEDs is using an array arrangement, such as that described in the paper by M. Zeiler, J. Huttner, L. Plotz, and H. Ott entitled "Late-News Paper: Optimization Parameters for LED Backlighting Solutions" SID 2006 Digest pp. 1524-1527. Using this type of solution, an array of LED clusters using Red (R), Green (G), and Blue (B) LEDs is deployed as a backlight for an LCD displays. Two types of clusters are described: RGGB and RGB. Similarly, U.S. Pat. No. 6,789,921 entitled "Method and Apparatus for Backlighting a Dual Mode Liquid Crystal Display" to and for very high-end monitors and TV panels, array arrangements do not appear promising, due to problems of poor color and brightness uniformity, high parts count, high heat, and dimensional requirements.

Light guides have been employed for spreading light from a point source in order to form a line of light. For example, U.S. Pat. No. 5,499,112 entitled "Light Guide, Illuminating Device Having the Light Guide, and Image Reading Device and Information Processing Apparatus Having the Illuminating Device" to Kawai et al. discloses redirecting light from one or more LEDs to a line in a scanning apparatus, using a single light guide having extraction features distributed along its length. U.S. Pat. No. 5,400,224 entitled "Lighting Panel" to DuNah et al. describes a molded panel assembly having multiple light guides that are treated with randomized roughness over a back surface for backlighting illumination.

A number of solutions have been proposed for redistributing LED light over a larger area, along a light guiding panel. One proposed solution is the MicroLens™ molded light guide from Global Lighting Technologies Inc., Brecksville, Ohio that spreads light from a single LED over a larger light panel. Similarly, U.S. Patent Application Publication No. 2003/0123246 entitled "Light Emitting Panel Assemblies" by Parker shows a small-scale light panel using multiple point sources with optical "deformities" that redirect light into the panel.

Another type of solution first directs the light from the LED, lamp, or other point source along a line, then spread this light over a panel. For example, U.S. Pat. No. 5,835,661 entitled "Light Expanding System for Producing a Linear or Planar Light Beam from a Point-Like Light Source" to Tai et al. describes a beam-expanding light pipe that directs a line of light to a light panel for distribution over an area. Similarly, the luminaire arrangement described in U.S. Patent Application No. 2005/0231973 entitled "Efficient Luminaire with Directional Side-Light Extraction" by Cassarly et al. uses a light pipe with a light extraction structure for redirecting light along a backplane, such as for an exhibit or display case. As yet another example of this approach, U.S. Pat. No. 5,857,761 entitled "Illumination Device" to Abe et al. describes a light guide that spreads point source light into a light radiation plate.

Still other backlighting solutions employ flexible optical fibers for directing light from a single light source, then treated for spreading the light for emission behind an LCD panel. Different versions of this approach are described, for example, in U.S. Pat. No. 6,714,185 entitled "Back Lighting Apparatus of Liquid Crystal Display Using Optical Fiber" to Kim et al. and in U.S. Pat. No. 5,542,016 entitled "Optical Fiber Light Emitting Apparatus" to Kaschke.

As the above-cited examples attest, there has been considerable work directed to the goal of providing LED backlighting. However, although there have been a number of solutions proposed, there are significant drawbacks inherent to each type of solution, particularly when faced with the problem of backlighting for a display panel of standard laptop dimensions or larger. The 2-D matrix proposed in the '921 Deloy et al. disclosure would be difficult to implement inexpensively, of relatively high cost, bulky, and prone to uniformity problems. The light guide arrangement described in the '112 Kawai et al. disclosure is optimized for scanning applications that require a uniform line of light, rather than display backlighting applications. The molded panel arrangement described in the '224 DuNah et al. disclosure may work well enough for general illumination, but would be prone to uniformity problems for full-color display applications. This type of solution is increasingly expensive to manufacture in larger sizes and is subject to warping due to heat and mechanical stress. More importantly, such a solution does not provide good color mixing and would not be well suited to applications using solid-state light sources. Point source-to-panel configurations such as those described in the '3246 Parker application are impractical and exhibit uniformity problems for color and brightness for larger-sized displays. Light-guide-to-back-panel arrangements such as those described in the '661 Tai et al. disclosure are inefficient, are subject to poor uniformity, and are suitable only for relatively small displays. The use of treated optical fibers has advantages for small-scale handheld displays but would be impractical and inefficient for desktop or larger display designs.

In addition to these drawbacks, conventional solutions generally fail to address important challenges for high-quality color imaging, required for widespread commercialization and acceptance of LC displays. Color gamut is one important consideration that is of particular interest to display designers. Conventional CCFLs provide a measure of color quality that is acceptable for many applications, offering up to about 70% of the NTSC color gamut. Although this may be acceptable for laptop and computer monitor applications, it falls short of what is needed for full-color TV displays.

In contrast to CCFL light sources, LEDs and other solid-state light sources, because of their relatively high degree of spectral purity, are inherently capable of providing 100% or more of the NTSC color gamut. In order to provide this enlarged color gamut, three or more different-colored LEDs or other solid-state sources are needed. To support such an expanded color gamut when using LEDs and other solid-state light sources, a high level of color mixing is required from the backlighting apparatus. As is well known to those skilled in the imaging display art, achieving a good level of color uniformity when using solid-state light sources, such as Red (R), Green (G), and Blue (B) LEDs, is particularly challenging. Conventional backlighting solutions that employ larger-area light guides, such as those described above, would provide correspondingly inferior color mixing.

Other challenges related to backlighting for larger scale displays include the need for low-cost assembly, light efficiency, uniformity, and compact size. As noted earlier, conventional LED backlighting solutions fall short of what is needed to meet these additional requirements. The uniformity and brightness Of LED based displays needs to be improved. There have been numerous suggestion for improved light extraction for both lightguide plates and lightbars. For larger displays being able to redirect or extract light in a uniform manner is difficult. There remains for an improved means of light redirection.

Thus, it can be seen that there is a need for an LED backlight solution that can be inexpensively manufactured, has minimal thickness, and provides color mixing with good uniformity, high brightness, and high levels of efficiency.

SUMMARY OF THE INVENTION

The invention provides a solid lightguide comprising opposite TIR surfaces, containing a desired pattern of light redirecting surface features located between the TIR surfaces and interrupting one of the TIR surfaces, the features having a refractive index differing from that of the solid material of the light guide. The present invention advances the art of backlight illumination and provides an improved high level of color mixing needed to take advantage of solid-state light sources. For example, the desired pattern may be formed as a integral part of the light guide, it may be added after the lightguide has been formed or it may be added to a lightguide as an optical film.

The invention may also be used with variations in the backlight apparatus and a display employing the backlight apparatus. Processes for providing light redirection are also disclosed. It is an advantage of the present invention that it employs solid-state light sources to provide area backlighting for a display. The apparatus of the present invention is scalable and is particularly adaptable to larger sized LC panels.

It is a further advantage of the present invention that it may be used with light guide plate or other planar type panel, As well as elongated illuminators.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 1A is a schematic of a lightguide plate with variable height indents

FIG. 1B is a schematic of a lightguide plate with variable density indents

FIG. 1C is a schematic of a lightguide plate with indents

FIG. 2 is a schematic of a lightguide plate with optical film with indents

FIG. 3A is a schematic of a lightguide with integral indents and prism light input end FIG. 3B is a schematic of a lightguide plate with large prism light input end and attached optical film.

DETAILED DESCRIPTION OF THE INVENTION

Figure 4:
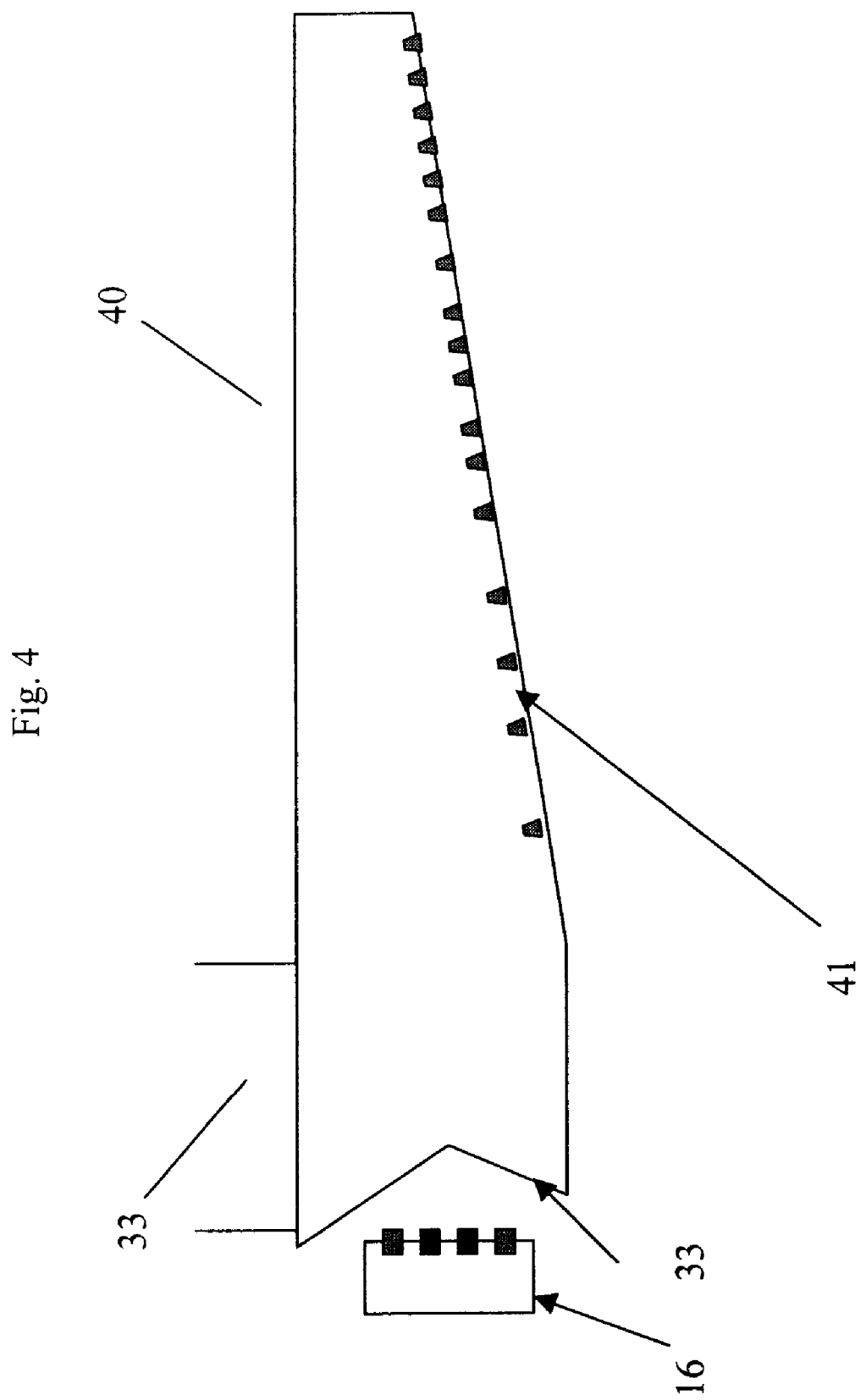
FIG. 4 is a schematic of a lightguide with an initial light mixing section and a tapered surface with indents

The present invention provides a lightguide that serves as a backlight apparatus that is well-suited to display applications, particularly for LC display panels, such as those used for LCD TV, medical diagnostics displays, imaging displays, and military displays, for example. In addition, the lightguide apparatus of the present invention can be used for other illumination applications where solid-state lighting is advantageous.

In the context of the present disclosure, the term "solid-state light source" has its conventional meaning accepted by those in the illumination arts, indicating a type of emissive light source formed from semiconductor materials. Solid-state light sources include, for example, Light-Emitting Diodes (LEDs), Organic Light Emitting Diodes (OLEDs) and (Polymer Light Emitting Diodes) PLEDs, as well as semiconductor lasers. Generally the term solid state light source as used herein means any source of light from a small point-like source but the design of the emission source may be such that the light being emitted is either collimated or spread so as to appear to be non-point-like. An array of several solid state light sources may be arranged in a manner or with lens elements so as to combine the light in a broader non-point-like source.

In the context of the present disclosure, light redirection is described as upwards and substantially towards the view said of a display or light emission side of a lighting device. A light guide serving as a backlighting apparatus thus emits light upwards from an illumination plane. The terms "below" and "above" then comply with this direction assignment. The term view side and non-view side refer to the side for viewing or light emission and the non-view side is the side opposite of the view side. A display panel is a transmissive spatial light-modulating device, such as an LC display device or other array of light valves. The term linear or elongated as used herein with respect to illuminator and light channels means much longer in length than in width, typically approaching the length of the display in one (length) direction but not nearly that long in the other (width) direction. The se terms may be straight or curved such as serpentine. Examples may include a variety of cross-sectional end-shapes such as square, rectilinear, round, triangular or they may be a composite shape of two or more shapes. At least one surface of the illuminators or light channels may comprise a means to extract or otherwise breakup or redirect the total internal reflection of the light channel. Such a means may to done in a manner provide uniform light appearance. The terms as used herein elongated illuminator and light bars are the same. The term light input side or end refer to the primary side in which light from the light source enter the lightguide. The terms as used herein holes, indents and light redirecting features refer to changing the direction of light towards the view side of the lightguide, elongated illuminator or the display.

The embodiments of the above-mentioned co-filed US Application for Attorney Docket 93845 are incorporated herein by reference.

The solid lightguides with elongated illuminator useful in this invention extended along an illumination plane and redirect light upward, in the direction of a display panel. The display panel and illumination plane are substantially in parallel. The primary direction of light from light channel array is upward and towards the display panel or viewer. As can be well appreciated by those skilled in the imaging arts, elongated illuminators could be disposed orthogonally so that they extend in the general direction of the x axis and are spaced apart by some distance along the y axis. In subsequent description and figures, extension along the y axis is shown, but the orthogonal arrangement could alternately be used. In some embodiments useful in this invention, the elongated illuminators have a center to center spacing between elongated illuminators of less than 25 mm.

A typical elongated illuminator light channel has a length dimension L that is well in excess of its width dimension W or thickness dimension T. Preferably, length L is greater than 5 times width dimension W. Preferably, width dimension W and thickness dimension T differ from each other by no more than a factor of 2. In one embodiment dimensions T and W are approximately equal. Maintaining dimensions W and T at much less than length L improves color mixing and uniformity, since light that is directed into elongated light channel 18 is propagated through this light-guiding structure by means of Total Internal Reflection (TIR). Because it uses TIR, elongated illuminator light channel is highly efficient, with very low light loss except in the intended direction as provided by light extraction element. In other embodiments useful in this invention the length of the elongated illuminators to the light input surface area has a ratio of greater than 100/1.

It is desirable to provide lightguides that provide on-axis brightness of greater than 2000 cd/m2.

As noted earlier, achieving a high level of color uniformity when using RGB LEDs can be a significant challenge. A single LED might alternately be used, such as a white light LED. Alternately, additional color LEDs can be used to increase brightness or enhance color gamut, such as to provide an RGGB arrangement or to add cyan, orange, or other colors. Other lighting arrangements are also possible, as is described in more detail subsequently. In some embodiments having more than one solid state light source per light input surface may be useful. For long lengths of elongated illuminators, having more than one light source per light input surface provides more light without having to run at high levels of power and risk potential burn out of the solid state light source. Having more than one light source also helps to assure that there is sufficient light to reach the far regions of the solid waveguide while maintaining sufficient brightness.

There are a variety of film with different functionality that may be used with the solid waveguides of this invention. These include but are not limited to a diffuser that could be a bulk type diffuser that employs pigments, air voids, or internal glass beads. Alternately, the diffuser could be a surface type diffuser, for example, a beaded surface with mono or multi-sized beads with a transparent binder. A Fresnel lens type diffuser could also be used. The solid lightguide use in a display that is useful in this invention may further comprises at least one function selected from the group consisting of light diffusing, light collimation, brightness enhancement, light polarization, light modulating, light filtering, a light source. Such functions are useful in providing higher brightness, good on-axis as well as off-axis viewing. Light collimation, diffusion and scattering helps to manipulate light to provide the most pleasing viewing to the viewer.

Light management films discussed above may include but are not limited to various types of light enhancement films or Brightness Enhancement Films (BEF), such as Vikuiti™ Thin Brightness Enhancement Film, a product of 3M, St. Paul, Minn. Polarizers can also be provided, such as reflective polarizers. The film and their functions may be combined into a single film with more than one functionality.

In the present invention if the lightguide comprise elongated illuminators, they may be distributed in any of a number of configurations The separation distance between adjacent elongated illuminators can be varied based on factors such as the needed brightness, area, and uniformity. Adjacent elongated illuminators can be adjacent, but not optically coupled. An integral bridge may join one or more elongated illuminators in part of the profile as shown in some of the figures in this invention. Such integral bridges are useful for providing improved stiffness and may also help to provide improved brightness uniformity between elongated illuminators.

Fill factor can be an important consideration for achieving needed brightness levels, as well as for mixing spectral components where light sources of different wavelengths are used. Fill factor for each the lightguide and or elongated illuminator would be computed as the ratio of the surface area of the one or more light sources that direct light into light channel to the incident light surface area of light channel. Fill factor for backlight apparatus would be computed as the ratio of the sum of the emissive areas of elongated illuminators to the surface area of illumination plane of the apparatus.

Light Sources

Each lightguide or elongated illuminator has at least one independent solid-state light source 16. Solid state light source can be independent in that it delivers light.

Solid-state light sources 16 could be LEDs, as noted earlier. LEDs are advantaged due to their high brightness and good spectral characteristics. Providing direct light emission within narrow wavelength bands, LEDs are thus capable of providing illumination that offers an improved color gamut over conventional light sources. CCFL sources, for example, offer about 70% of the NTSC color gamut when used with an LCD panel. LED sources can achieve 100% or greater of the NTSC range. LEDs also are advantaged because they can be rapidly pulsed.

Elongated illuminators and in particular solid waveguides with a mixing section of the present invention provide a high degree of color mixing for LEDs. Unlike light guiding plates and other conventional solutions, the solid waveguide with elongated illuminators and mixing sections that form a light channel with relatively narrow width dimensions provide excellent color mixing. This arrangement yields a substantial number of reflections as light propagates through the mixing section and down the path provided by the elongated illuminators light channel. TIR activity. Red (R), Green (G), and Blue (B) LEDs can be positioned as an RGB triad of LEDs at one or both ends of light channel 18. An RGGB arrangement, with more than one LED of one or more colors could alternately be used to boost the green light level. Alternately, R, G, and B LEDs could be distributed at different ends of light channel, so that, for example, a single light channel has a Red and a Green LED on one end and a Green and a Blue LED on the other end. Optionally, a fourth LED, such as a white light LED, or other color LED, could be positioned at one or both ends of light channel. In another embodiment, each separate light channel could have a single color light source, so that, for example, three adjacent light channels have Red, Green, and Blue LEDs respectively.

Dichroic filters could be used to direct light into individual elongated light channels Light sources can be continuously on, so that mixed RGB or white light is provided to display plane. Alternately, color sequential backlighting arrangements are possible. In one embodiment, R, G, and B are rapidly cycled from backlight apparatus by activating the corresponding light sources 16 in sequence. Alternately, a linear scan can be provided, with R, G, and B or other colors provided in a scrolling sequence across the surface of backlight apparatus. A display plane can then activate corresponding rows or columns of pixels with the same sequence, providing sequential modulated color. Such an arrangement would obviate the need for a color filter array, for example, with an LC display. Mixed colors such as cyan, magenta, and yellow could alternately be provided using timed activation of the light sources.

Laser light sources could alternately be used with elongated illuminator of the present invention. Their relative spectral purity and fast response times make lasers an attractive alternative for some types of display applications. The high brightness and high optical power levels of lasers may allow a single source to illuminate multiple elongated illuminators light channels.

Alternative light sources that are can be used with elongated illuminator may include Organic Light Emitting Diodes (OLEDs) and (Polymer Light Emitting Diodes) PLEDs.

Light Channels

Lightguides and elongated illuminator light channels are formed from highly transparent materials, including various types of glass, such as a laminated safety glass. Plastics that can be used include PMMA, polycarbonate, polyester, polyamide, polysulfone, polyolefin, cyclic-olefin and copolymers thereof. Light channels may have additives for improved thermal and light stability. Optical transmission of the material should exceed about 90%. Except where intentionally treated, surfaces of light channel should have an optical finish. A high index of refraction n is preferred for its favorable light-guiding properties.

In fabrication, the lightguide and or elongated illuminator light channels could be cast, profile extruded, or molded, for example. Further conditioning of the material, such as by heating and polishing, could be beneficial for achieving improved optical performance. It is also useful to provide solid waveguide and elongated illuminators with a high degree of smoothness. Having a TIR surface with less than 50 nm Ra of roughness helps to minimize light leakage due to scattering when light hits a rough surface. Rough surfaces will breakup the TIR of the light and change its angle such that it may exit the elongated illuminator in an undesired point. This can reduce the overall effectiveness of the elongated illuminators.

For elongated illuminators a high degree of stiffness or rigidity is advantageous for providing light channel as a modular component for a larger backplane apparatus. High stiffness allows for simple handling and ease of assembly of light pipe array. A stiffness in excess of 10 mN is preferred. A clip, holder, or other support can be used to help prevent sagging or bowing for light channels of longer length. Light channels should have a width W dimension that is sufficient to constrain bending. Additional support structures, if needed, can be used to prevent sideways bending.

Elongated illuminator light channels may be separated from the light source by some distance in the embodiments shown in the present application.

However, it is also possible to embed light source within elongated light channel.

Light Redirection Features

There are a number of embodiments for light redirection elements or features as shown in the figures in this disclosure. The basic function of light redirecting features of elongated illuminators or lightguides is to direct light that is otherwise being channeled by TIR and thereby cause light to be turned and then emitted from view side of the elongated light channel. This can be done in a number of ways, including the following:

(i) Treatments to the lightguide or elongated illuminators are typically applied to or formed on the non-view side. The means of light redirection useful in this invention are formed inwardly or pointed towards the view or emission side of the lightguide or illuminator. They interrupt the non-view side TIR surface and are therefore located between the two primary TIR surfaces. They from an a series of indents. The indents typically are small in there size but differ from previous microstructures because they can be much larger. While they can be in the few microns size range, they also can be in the hundreds of microns. Most any shape may be used but preferably they are prisms, pyramids, hemispheres, holes, compound shapes or other well-defined geometries to frustrate TIR. Microstructured indents could be molded, embossed, extrusion roll molded, drilled, or otherwise formed. They may vary in their shapes and sizes, as a function of the distance from the light source. The micro-indents may be formed as an integral part of the lightguide or elongated illuminator or they may be formed as part of an optical film and then adhered to the lightguide or elongated illuminator. Examples of adhesives used include pressure or heat sensitive or curable adhesives using e.g. ultraviolet or electron-beam radiation. Chemical cross-linking materials such as epoxies could alternately be used. Adhesives capable of withstanding a broad temperature range (−40 to 85 C) are often required for LCD display applications. Adhesive that can withstand higher temperature range (60-85° C.) and higher relative humidity (95% @ 65° C.) would be preferred. A high degree of optical transmission would be preferred. Additives and in particular nano-particles could be used to modify the refractive index of adhesives. A fine-tip dispenser or hot melt glue dispenser could be used to attach segments of a film component to an elongated or in the case of a lightguide the adhesive could be applied as layer (coated or transferred) and then an optical film with the desired indent pattern could be laminated. It should be noted that the adhesive layer could be coated or transferred to the opposite side of the optical film containing the indents and then that film with the adhesive could be laminated to the lightguide or elongated illuminator. An optional release liner could be applied to the optical film and adhesive and then removed prior to lamination. Optionally, the non-light emissive surface of elongated illuminator may be featured to form light redirecting structures thereon. A portion of illuminator or lightguide can be molded such as using a roller or otherwise treated to form light-redirecting microstructures. in an injection molding process, light redirecting structures may be formed as part of the mold. Then, as the polymer is injected and cooled, the light extraction structures become an integral part of elongated illuminator. In a process using extrusion roll molding, a polymer could be melted and then cast on to a roller or belt that had the desired feature. The resulting film or article would have the desired indent pattern. UV or other chemical polymer could be cast into a mold or onto a roller or belt with the desired pattern to form an article or film layer. It should also be noted that a layer could be formed and then the desired pattern form into that layer or film.

Combinations of these types of the above process could also be used. Light redirecting features could be individual elements. In order to provide uniform light emission along the length of lightguide or illuminator, the size and density of the indents may vary as a function of the distance along light channel from solid-state light source. For example, where there are LED light sources at each end of light channel, light redirecting features could be distributed with higher density near the center than toward the ends. Alternately, the distribution density of light redirecting elements could be substantially continuous in one direction.

Light redirecting may be provided on more than one surface. The opposite side of light channel, furthest from the LCD and output surface, generally provides a smooth surface to prevent light leakage but may alternately be structured, treated, or roughened to enhance the amount of light extraction.

Light redirecting elements may be molded into, embossed, pressed, adhered, printed or laminated to the of elongated illuminator or lightguide.

Monitoring Color Shifts

One well-known problem with LEDs and other types of solid-state light sources relates to spectral stability and accuracy, which can cause some amount of color shifting. an optional color sensor can be provided as a component of one or more elongated illuminators. Color sensors can be used in a control loop that compensates for color shifts such as can be due to ageing, heat, or manufacturing differences between LEDs or other types of light source. Optionally, image data for pixels nearest a particular light pipe can be adjusted to compensate for detected color shifts.

System Considerations

Using any of a number of devices currently available, elongated illuminator or light guides of the present invention are capable of providing a high level of illumination, at between 2000-6000 nits or higher. At high energy levels, heat buildup can be a problem with LEDs in some applications. Backlight apparatus can provide one or more heat sinks, cooling fans, or other mechanisms to help dissipate excess heat during operation. Advantageously, heat-dissipating components can be positioned along peripheral edges of a display device, away from the LCD panel when using the apparatus and methods of the present invention.

EMBODIMENTS

FIGS. 1A, 1B and 1C are side view cross sections of solid lightguide 10 with a series of holes or indents 11, 12 and 13 that are formed in the non-view side. The lightguide may be lit from one or both ends by light source 16. If lit from one end only, there may be a reflector on the end opposite the light source. The holes or indents may be any shape or size or may vary in shape and or size as a function of distance from the light source. In some embodiments the holes have the same relative size in the width and length dimensions. The features in general may be in the 1-300 micron size range in their depth although larger or slightly smaller may be desirable. The features are useful in scattering light and redirecting it towards the view side of the lightbar. The lightbar may be flat, tapered, round or other shape or compound shape. There may be a light mixing section to provide improved light mixing uniformity. The spacing, density, size and shape may be varied to provide uniform lighting along the length of the lightbar. While only a side view is shown in these figures, the side dimension may also vary in the number of features. The lightbar may also provide means to more efficiently couple the light source into the lightbar. These may include but is not limited to indented or recessed ends, reflectors, embedding the light source in a flexible media such as an adhesive, providing a lens to shape, collimate or otherwise direct the light as it exits the light source. Such a means helps to setup a TIR angle into the lightbar to optimize the amount of light entering vs. the amount of light that exits the light source. Additionally the holes and indents as well as the other means of optimization the light bar may be applied to and used in a lightguide plate vs. a light bar.

FIG. 2 is a lightguide with optical film 21 that has a series on light redirecting indents that have been cast, embossed, molded or otherwise formed in the non-view side of the optical film. Optical film 21 may be adhesively attached to the lightguide by adhesive layer 22. The adhesive may be an optically clear adhesive with a high level of transmission. Greater than 80% transmission is desirable and greater than 90% provides a backlight that is more efficient in providing uniform light transmission as well as redirecting light towards the view side. The adhesive thickness may be between 0.3 and 75 microns. It should be noted that adhesives typically have lower adhesive strength with thinner thicknesses and will absorb more light as the thickness increases. The most preferred range is between 10 and 25 microns. Additionally the refractive index of the adhesive should be matched within 0.02 of the film used to make the indents as well as of the lightguide material. In some other embodiments useful in this invention, the adhesive may be patterned or continuous in either the length or width dimension of the lightguide. The adhesive should have sufficient adhesive property to withstand environmental conditions for displays and display components. The lightguides useful in this invention may be of any design (square, rectangular, circular, tapered) in their profiles. They may also contain a mixing section, they may be lit from one or both ends, they may also reflectors). The indents may have a depth of from 1-300 microns. The side of the indents may be straight, rounded or tapered. The relative shape of the indent may be, for example, square, rectangular, triangular, conical, cylinder-like, lens-like, disc-like, trapezoidal or part trapezoidal. The relative depth of the indents may be substantially equal for all the indents on the lightguide, and they may vary in their depth as a function of distance from the light source. The spacing between thee indents as well as the packing density of the indents may also be varied to help provide more uniform light mixing and luminance uniformity. The indents may be discrete features or they may patterned in a manner to form areas of interconnects that join two or more indents so as have continuous indents. The indents may also vary in their top view profile surfaces may be slightly rough.

FIG. 3A is a solid lightguide 10 arrangement with at least one prism shape light input end 31 on at lest one end, at least light source 16, a means of light redirection between the two TIR surfaces 35 (view-side) and 34 (non-view-side) of the lightguide 10. The means of light redirection is formed as an integral part of the lightguide. The light redirection means 36 are a series of indents in the non-view side surface. The indents may vary in their size, shape and density as the distance from the light source changes. If the lightguide has two or more light sources that oppose each other the indent pattern will change from both ends with a higher density or height in the center. If lit from only one end, the end opposite the light input end may further comprise a reflector. The reflective means may be spectral or diffusive. There is also a small region near the light input ends where there is no extraction or reflective features (at least very minimal). Such a region is useful in providing color mixing. Such a region is particular useful for elongated illuminators. Additionally there is a light mixing section 33 on the light input end.

FIG. 3B is a similar lightguide 10 with mixing section 33 and a prism shape light input ends 32 covers the entire light input end and the indents are applied as an optical film 34 with an optically transparent adhesive 22.

FIG. 4 is a lightguide 40 with an initial light mixing section 33 and a tapered surface with indents 41. It should be noted that the two major TIR surfaces are not parallel to each other outside of the mixing section. The slope of the tapered side is designed to aid in light redirecting in conjunction with the indents. The indents may be varied in their size, shape and density in order to provide for the highest level of brightness and uniformity along the length of the light. The above figure may also be an elongated illuminator.

Figure 5A:
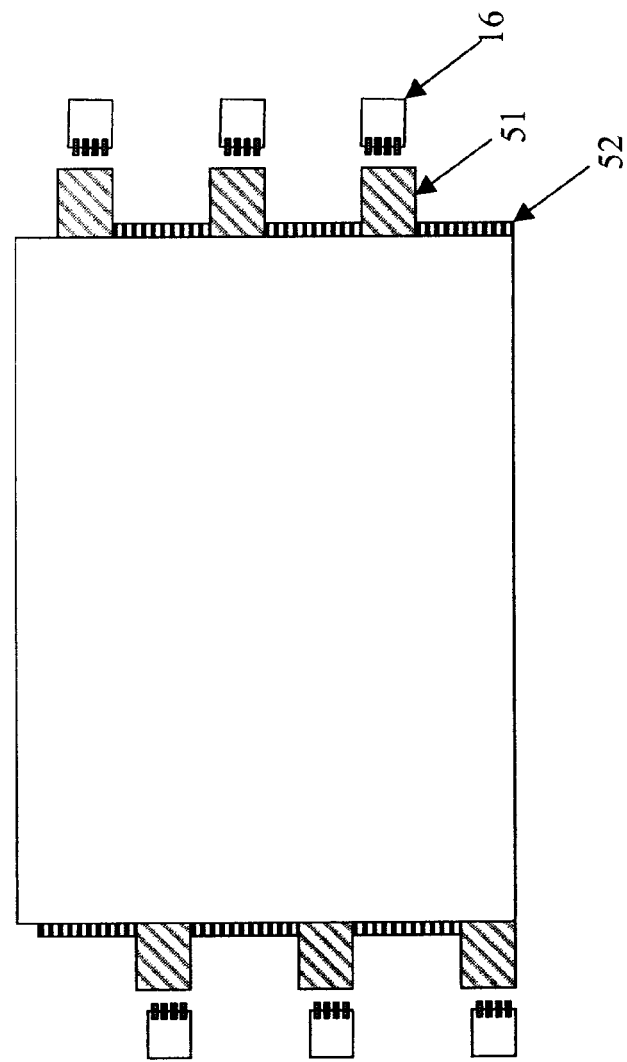
FIG. 5A is a schematic of a solid lightguide with mixing tabs

FIG. 5A is a plan view of a solid lightguide 53 with solid state light source 16 and mixing tabs 51 and reflective surface 52.

Figure 5B:
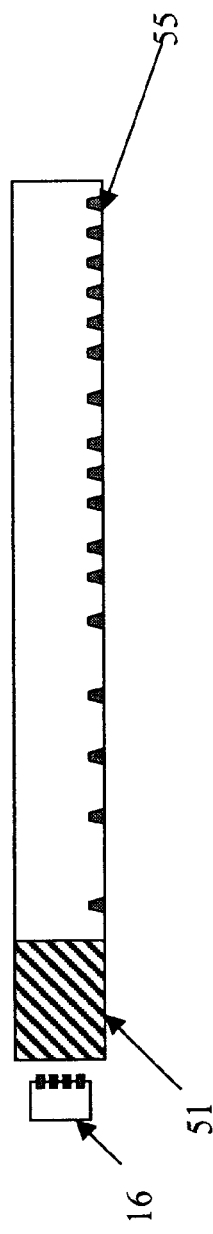
FIG. 5B is a schematic of a solid lightguide with light redirecting features

FIG. 5B is a cross sectional view of a solid light guide 53 with light redirecting features 55 and color mixing tab 51 that provide uniform color temperature from light source 16. While the light redirecting features are shown as an integral part of the lightguide other embodiments would provide a lightguide with an optical film that has the light redirecting features in it.

Other useful embodiments of this invention may provide a light guide with elongated channels and integral bridge that attaches the light channels to form a hybrid elongated illuminator and lightguide.

A useful embodiment of this invention forms a solid lightguide comprising opposite TIR surfaces, containing a desired pattern of light redirecting surface features located between the TIR surfaces and interrupting one of the TIR surfaces, the features having a refractive index differing from that of the solid material of the light guide. Such an embodiment provides for a lightguide with integral features. By being internal that are less prone to damage and they have a predefined amount of lower refractive index material that helps to control and redirect light in the intended direction. In an embodiment of this invention the light redirecting surface feature comprises a material with a refractive index difference of greater than 0.02 than that of the material used to form the lightguide or elongated illuminator. In a useful embodiment the light redirecting surface feature comprises air and in other embodiments the light redirecting surface feature are indents.

In other useful embodiment the redirecting feature being an indent or otherwise devoid or material can be filled with a phosphorescence material. In such an embodiment the phosphorescence material could adsorb some of the light energy and then re-admit it.

In other useful embodiment the light redirecting features have a three dimensional shape. The shapes of the light redirecting surface feature comprise at least one shape selected from the group consisting of conical-like, cylinder-like, trapezoidal-like, lens-like, round, square, triangular, pyramidal. In other light redirecting surface feature may have a compound shape. If the feature has a vertex, typically it is desirable to have the point of the vertex facing the light emission side of the lightguide. In other useful embodiments of this invention the light redirecting surface feature taper from wide to narrow from said interrupted surface towards the opposite TIR surface. This is useful in providing the maximum amount of light that is redirected to the emission or view side of the lightguide. The light redirecting surface feature may comprise at least one individual element. Useful embodiment for light redirecting surface feature are discrete. Features. Discrete or individual elements are easily formed and provide the highest degree of flexibility for controlling the amount and uniformity of redirected light in a lightguide or elongated illuminator. It should be noted that in other embodiments the light redirecting surface features may be interconnected. The features may also be formed to simulate or form a channel.

The light redirecting surface feature of this invention may have a depth of between 0.1 to 300 microns but preferable the light redirecting surface feature has a depth of between 1 and 100 microns. If a tapered hole is formed the height is measured from the vertex to the surface of the layer in which they were formed. With tapered holes or indents, the width changes depending where they are measured. It should be noted that variation of lightguides can also provide good utility using these type of indents even in the two TIR surfaces are not parallel to each other. In the case of a tapered lightguide or elongated illuminator, the major surfaces are not parallel and the indent pattern parameter may be varied in conjunction with the light redirecting features in order to provide the highest level of brightness and uniformity. The solid lightguides of this invention that are useful embodiments have their light input surface that is not substantially parallel to the TIR surfaces. The advantage is that the form factor may be reduced which has great appeal to the consumer. Having display that are thinner allows for less materials in the construction of the display. The light directing surface features may vary in their density as a function of the distance from the light input surface. Typically the desire is to provide an initial light mixing section that provide uniform color temperature. Such a mixing sections do not require light redirection and are adjacent to the light input surface. The length of the mixing section may vary but only a few millimeters of length is required to achieve excellent light mixing. The density function along the length of the waveguide or elongated illuminator has a difference in the density function of the light redirecting features.

A useful embodiment of this invention is a display comprising a solid lightguide with opposite TIR surfaces, containing a desired pattern of light redirecting surface features located between the TIR surfaces and interrupting one of the TIR surfaces, the features having a refractive index differing from that of the solid material of the light guide. A preferred material for the light redirecting features is air. The feature is a hole or a region that is devoid of material other than a gas. While it is possible to fill all or some of the holes with another material, the higher the refractive index difference between the hole including any material that may fill the hole and the material of the light guide the more efficient the light redirection. It should be noted that the hole may be completely or only partly filled with a material and the material may be a composite material such as foam that has multiple air bubbles. Other useful display embodiments of this invention may further comprise at least one function selected from the group consisting of a light source, light diffusing, light collimation, light scattering, light recycling, polarization, light modulation. The use of these function material provide for improved light manipulation such as light diffusion, improved on-axis brightness, improved brightness for off angle viewing.

Since the light redirection features useful in this invention are holes or region that are devoid of material a method of forming a solid lightguide with the desired pattern of light directing features is formed by drilling, molding, embossing, casting or other means known in the art. Lightguides may vary in thickness from 10 to 30 mils to thicker ones that can be several millimeters. For lightguides that are thin methods such as extrusion roll molding are preferred because the basic lightguide can be formed by casting a polymer onto a roller or belt that contain protrusion that will form a hole or indent in the resulting film. Such a method could use PMMA, polysulfone, polycarbonate, polyester, acetate or other transparent polymers. Typically the polymer is heat above its melting point and then extruding directly or indirectly onto a moving mold that forms a film with the desired light redirection features. Some polymers may be dissolved in a solvent and the resulting solution cast on a forming wheel or belt. In other process embodiment of this invention a film or slab may be form first and then the desired pattern of holes be impressed into the surface by the addition of heat and or pressure. Another useful method is to form a film or slab of the lightguide and then cast another layer on at least one side and then form the desired pattern into that layer. This method may use a variety of polymers but one preferable material is a UV curable layer that can be molded with the desired light redirection features and then cured during the process of forming the pattern. Useful means of UV casting and curing may further include a transparent mold that allows UV monomer and oligomers to be cured during the formation of the features. Other materials may be used in the layer addition method and then the desired feature pattern form by molding and or embossing. In another embodiment of this invention the light redirection features may be formed in or on a separate film and then that film is bonded to the lightguide or elongated illuminator. The use of a separate optical film that further comprise light redirecting features provides a great deal of utility in that the lightguide or elongated illuminator may be formed without the features and than a separate thin film can be used to form the features and attached to the lightguide or illuminator at a later date. The lightguide may be very stiff and attempts to form features on one side may cause problems with warped surface that do not provide a uniform means of light distribution. Waveguide are also very expensive and being able to add functionality a separate optical film is highly desirable and cost less to make. The optical film can be prescreened for quality and desired functionality. The film is transparent (>than 85%), free of any color, thinner is more desirable for less optical interference, The desired light redirection features may be formed directly into the film or into a separate layer. Similar methods of molding, casting, extrusion roll molding, embossing may be used.

A useful embodiment of this invention provides a solid lightguide with a view side and a non-view side comprising opposite TIR surfaces, an optical clear adhesive adjacent to the non-view side of said lightguide, an optical film (or layer) with a view side and non-view side comprising containing a desired pattern of light redirecting surface features located between the non-view side and view side of said optical film and interrupting the non-view side surface, the features having a refractive index differing from that of the solid material of the optical film. Such an embodiment is high in quality and is less expensive to make and provides a great amount of flexibility.

The optical film of use to form the above lightguide or elongated illuminator has light redirecting surface features that comprise a material that has a refractive index difference from that of the optical film of at least 0.02. The light redirecting features in the optical film of this invention may contain air or gas to provide a high difference in refractive index. between the features (which is a hole or region devoid of solid or liquid materials). The light redirecting features may have a depth of between 1 to 100 microns.

The light redirecting features may taper from wide to narrow from said interrupted surface towards the opposite TIR surface. The optical film and their said light redirecting surface features comprise at least one individual element. The features may be discrete and they may vary in their size, shape, height, density or other physical parameters. In some embodiment the individual features may be interconnect by a channel or arranged in a manner to form a combination of individual features and continuous features along the length or width of the lightguide or elongated illuminator. The density function may vary as a function of the distance from the light source. The optical film may also contain a region that is devoid of the light redirecting features. Such an area may be applied over a color mixing section where no light redirecting outside of normal TIR'ing is desired. The optical film of this invention provide for uniform light distribution and brightness along the width and length of the lightguide or elongated illuminator.

Another useful embodiment of this invention provides a display comprising a solid lightguide with a view side and a non-view side comprising opposite TIR surfaces, an optical clear adhesive adjacent to the non-view side of said lightguide, an optical film with a view side and non-view side comprising containing a desired pattern of light redirecting surface features located between the non-view side and view side of said optical film and interrupting the non-view side surface, the features having a refractive index differing from that of the solid material of the optical film. The display described above may further comprises at least one function selected from the group consisting of a light source, light diffusing, light collimation, light scattering, light recycling, polarization, light modulation. Such embodiments are useful in order to provide a display with good on-axis brightness and or wide viewing angle. A means of light modulation with a color filter is desirable to provide an image for the viewer In another embodiment a solid lightguide with a view side and a non-view side comprising opposite TIR surfaces, an optical layer with a view side and non-view side comprising containing a desired pattern of light redirecting surface features located between the non-view side and view side of said optical layer and interrupting the non-view side surface, the features having a refractive index differing from that of the solid material of the optical layer. In this embodiment a layer is provided on the light guide or elongated illuminator in place of an optical film. A method of forming the solid lightguide suitable for this invention provides a polymeric layer that is applied to one TIR surface and a pattern of light redirecting features is formed into said polymeric layer. Such a polymeric layer may further comprise a UV curable monomer or oligomer that is crosslinked to from a layer with the desired pattern of features.

EXAMPLES

Sample 1

One embodiment uses an acrylic elongated illuminator with a nominally ¼ in. square in cross section. The elongated illuminator is highly transparent and has an optical finish on all sides and ends. To form the elongated illuminator bar stock of PMMA (0.25"×0.25"×14 inches was optically polished on a lathe and then hand polished with a slurry of fine grit to obtain a surface Ra of less than 25 nm. on the sides and on the light input end. The backside or non-view side of the bar was drilled with a pattern of holes to provide the desired light redirection. The holes were drilled to an approximate depth of 100 microns. The initial section from the light input section was not drilled. There was a section that was approximately 10-15 mm that had no holes. This section served has a color mixing section.

An LED array is used as light source. Multi-die RGB LEDs are mounted in close proximity to the light input end. These multi-die LEDS consist of 1 red, 1 blue and 2 green die in a single package (OSRAM OSTAR Projection devices, type LE ATB A2A, from OSRAM, Inc.) These devices can be individually turned on, with the brightness of each die controlled by a separate current source. The sample was then evaluated for its relative light output uniformity.

Sample 2

In another example an optical film is made using a sheet of transparent polyester (Dupont ST 505) in which a layer of UV monomer is coated on one side and a transparent mold with a series of outwardly facing protrusion was pressed into the un cured monomer and then the monomer is cured with a UV light source to crosslink the layer. The mold is then removed leaving a thin layer with a series of holes. The optical film with the UV layer with holes was then glued (Norland UV epoxy) to the non-view side of a lightbar. The finished sample was setup with the same LED configuration as in sample 1.

The invention has been described in detail with particular reference to certain preferred embodiments thereof, but it will be understood that variations and modifications can be effected within the spirit and scope of the invention. The patents and other publications referred to in this description are incorporated herein by reference in their entirety.

PARTS LIST

10 is a solid lightguide
11 are holes or indents of different heights
12 are triangular shaped holes
13 are holes or indents with a flat top
16 is a solid state light source
21 is an optical film with holes or indents
22 is an adhesive layer
23 are the holes or light redirecting features in the optical film
31 is a prism shaped light input end
32 is a larger prism shaped light input end
33 is a light mixing section
34 is the non-view side TIR surface
35 is the view side tIR surface
36 is a light redirecting means
40 is tapered lightguide
41 is a tapered or sloped surface with holes.
51 is a light mixing tab
52 is a reflector
53 is a solid light guide
55 is a light redirecting feature

The invention claimed is:

1. A solid lightguide with a view side and a non-view side comprising opposite TIR surfaces, an optical clear adhesive adjacent to the non-view side of said lightguide, an optical film with a view side and non-view side containing a desired pattern of light redirecting surface features located between the non-view side and view side of said optical film and interrupting the non-view side surface, the features having a refractive index differing from that of the solid material of the optical film.

2. The optical film of claim 1 wherein said light redirecting surface features comprise a material that has a refractive index difference from that of the optical film of at least 0.02.

3. The optical film of claim 1 wherein said light redirecting surface features comprise air.

4. The optical film of claim 1 wherein said light redirecting surface feature has a depth of between 1 and 100 microns.

5. The optical film of claim 1 wherein said light redirecting surface features taper from wide to narrow from said interrupted surface towards the opposite TIR surface.

6. The optical film of claim 1 wherein said light redirecting surface features comprise at least one individual element.

7. The optical film of claim 1 wherein said light redirecting surface features are discrete.

8. A display comprising a solid lightguide with a view side and a non-view side comprising opposite TIR surfaces, an optical clear adhesive adjacent to the non-view side of said lightguide, an optical film with a view side and non-view side comprising containing a desired pattern of light redirecting surface features located between the non-view side and view side of said optical film and interrupting the non-view side surface, the features having a refractive index differing from that of the solid material of the optical film.

9. The display of claim 8 further comprises at least one function selected from the group consisting of a light source, light diffusing, light collimation, light scattering, light recycling, polarization, light modulation.

10. A solid lightguide with a view side and a non-view side comprising opposite TIR surfaces, an optical layer with a view side and non-view side comprising containing a desired pattern of light redirecting surface features located between the non-view side and view side of said optical layer and interrupting the non-view side surface, the features having a refractive index differing from that of the solid material of the optical layer.

11. A method of foaming the solid lightguide of claim 10 wherein a polymeric layer is applied to one TIR surface and a pattern of light redirecting features is foamed into said polymeric layer.

* * * * *